(12) United States Patent
Cai et al.

(10) Patent No.: US 8,837,500 B2
(45) Date of Patent: Sep. 16, 2014

(54) SERVICE DATA FLOW DIRECTION/REDIRECTION

(75) Inventors: Yigang Cai, Naperville, IL (US); Suzann Hua, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 200 days.

(21) Appl. No.: 13/167,522

(22) Filed: Jun. 23, 2011

(65) Prior Publication Data

US 2012/0327947 A1    Dec. 27, 2012

(51) Int. Cl.

| | |
|---|---|
| H04L 12/28 | (2006.01) |
| G01R 31/08 | (2006.01) |
| G06F 11/00 | (2006.01) |
| G08C 15/00 | (2006.01) |
| H04J 1/16 | (2006.01) |
| H04L 12/26 | (2006.01) |
| H04L 1/00 | (2006.01) |
| G06F 15/16 | (2006.01) |
| H04L 12/54 | (2013.01) |
| H04W 8/18 | (2009.01) |
| H04W 8/08 | (2009.01) |

(52) U.S. Cl.
CPC .............. *H04L 12/5691* (2013.01); *H04W 8/08* (2013.01); *H04W 8/18* (2013.01)
USPC ............................. 370/410; 370/241; 709/218

(58) Field of Classification Search
USPC ......................................................... 370/410
See application file for complete search history.

(56) References Cited

U.S. PATENT DOCUMENTS

2007/0038723 A1 *  2/2007  Gourraud ...................... 709/218
2008/0137541 A1 *  6/2008  Agarwal et al. ............... 370/241

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 8)" 3GPP TS 23.401 V8.2.0 (Jun. 2008).
"3rd Generation Partnership Project; Technical Specification Group Services and System Aspects; Architecture enhancements for non-3GPP accesses (Release 8)" 3GPP TS 23.402 V8.2.0 (Jun. 2008).

* cited by examiner

*Primary Examiner* — Noel Beharry
(74) *Attorney, Agent, or Firm* — Duft, Bornsen & Fettig, LLP

(57) ABSTRACT

Systems and methods are disclosed for directing/redirecting service data flows to Packet Data Networks (PDN). A subscriber database (e.g., HSS) stores direction/redirection criteria along with mapping data that includes information for directing/redirecting service data flows to PDNs. An element of a network may then query the subscriber database to direct or redirect service data flows to PDNs. The subscriber database receives a query from a network element, and identifies the direction/redirection criteria and mapping data for the data service. The subscriber database then transmits the direction/redirection criteria and mapping data to the network element in response to the query to allow the network element to direct/redirect a service data flow to a PDN for the data service.

14 Claims, 6 Drawing Sheets

FIG. 2

SUBSCRIBER DATABASE
*116*

DIRECTION CRITERIA PER PSI AND/OR PER PUID
    CONDITION 1    MAPPING DATA
    CONDITION 2    MAPPING DATA
    CONDITION 3    MAPPING DATA
           •
           •
           •

REDIRECTION CRITERIA PER PSI AND/OR PER PUID
    CONDITION 1    MAPPING DATA
    CONDITION 2    MAPPING DATA
    CONDITION 3    MAPPING DATA
           •
           •
           •

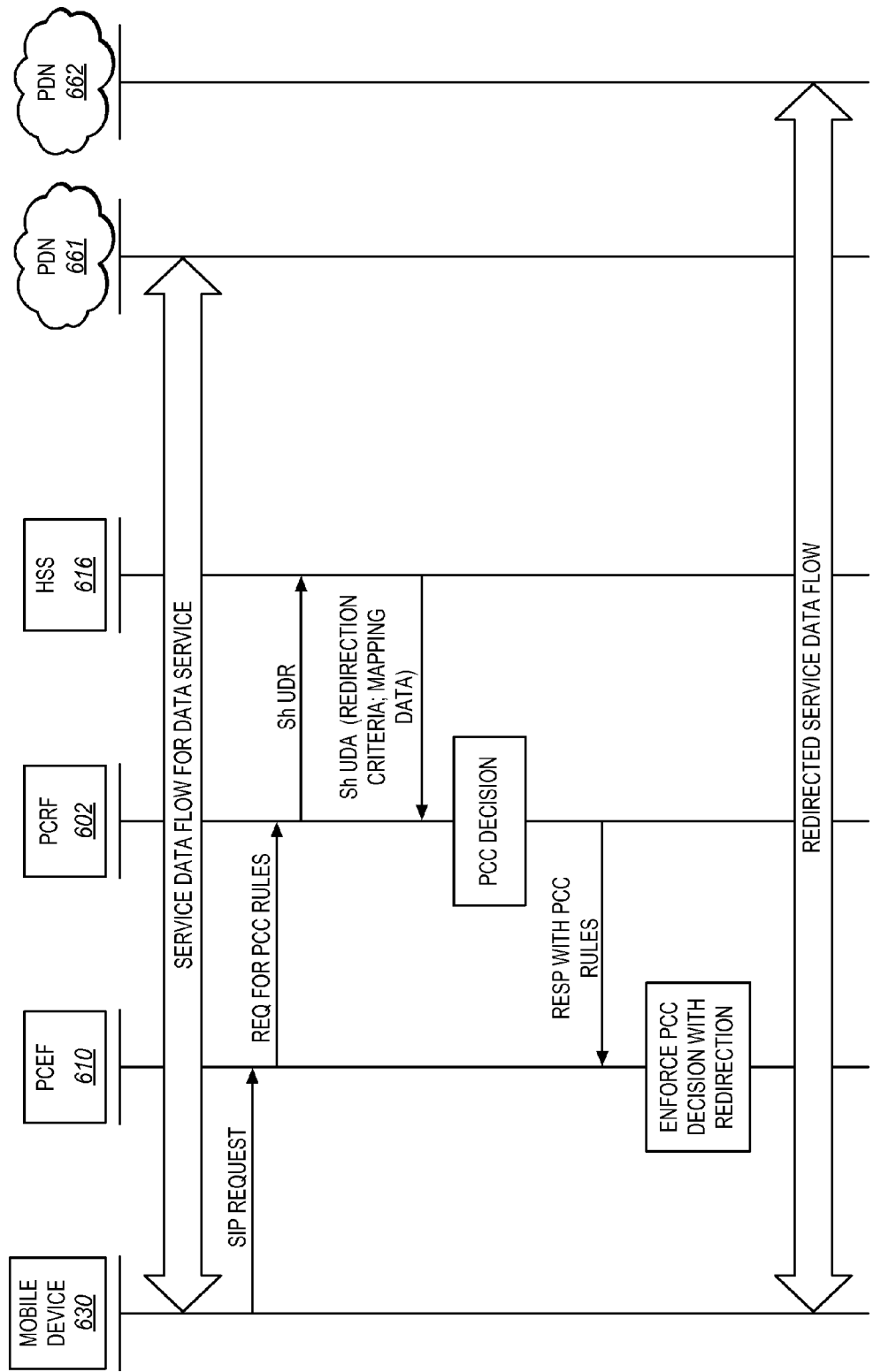

SERVICE DATA FLOW DIRECTION/REDIRECTION

FIELD OF THE INVENTION

The invention is related to the field of communication systems and, in particular, to directing or redirecting service data flows among packet data networks (PDN).

BACKGROUND

Service providers typically provide numerous voice and data services to subscribers. Examples of voice services are voice calls, call forwarding, call waiting, etc. Examples of data services are streaming audio, streaming video, Voice over IP (VoIP), online gaming, and Internet Protocol Television (IP-TV). The data services are managed by a packet core network, which interfaces the end user with external packet data networks (PDN), such as the internet. Some examples of packet core networks are a General Packet Radio Service (GPRS) core network, an Evolved Packet Core (EPC) network, etc. An end user uses a mobile device, such as a cell phone, a personal data assistant, a smart phone, etc, to connect with a Radio Access Network (RAN). The RAN may be a packet-based network that provides IP connectivity, which is also referred to as an IP Connectivity Access Network (CAN). The RAN in turn connects to the packet core network in order to provide the end user with access to the data services.

When the mobile device initiates a data session (e.g., an IP-CAN session), the session request from the mobile device includes a description of the requested data service (e.g., online gaming, IP-TV, etc). The packet core network authenticates the mobile device and determines which data services the mobile device is authorized to receive. If the requested service is authorized, then the packet core network reserves a bearer path (e.g., an IP CAN bearer) of a defined capacity, delay, and bit error rate over a selected PDN. A flow of packets may then begin for the service, which is referred to as a service data flow over the PDN.

The service providers typically implement Policy and Charging Control (PCC) within their networks. Policy control refers to the process of controlling the bearer path for service data flows. For example, policy control includes bearer establishment, Quality of Service (QoS) control, and gating control (e.g., blocking or allowing packets to pass). Charging control refers to the process of associating packets of a service data flow to a charging key or identifier, and applying online charging and/or offline charging, as appropriate. The service providers define PCC rules that may be used for data services that are requested by end users.

The 3rd Generation Partnership Project (3GPP, 3GPP2) has defined a PCC architecture for packet core networks. One example of a PCC architecture is described in 3GPP TS 23.203 (Release 9). The PCC architecture suggested by the 3GPP includes a Policy and Charging Rules Function (PCRF), a PDN gateway comprising a Policy and Charging Enforcement Function (PCEF), an application function (AF), a Bearer Binding and Event Reporting Function (BBERF), a Home Subscriber Server (HSS)/Subscription Profile Repository (SPR), an Online Charging System (OCS), and an Offline Charging System (OFCS). As a brief description of some of the elements of the PCC architecture, the PCRF makes policy control decisions and flow-based charging control decisions to select which PCC rules to implement for a service data flow. The PCEF in the gateway provides service data flow detection, user plane traffic handling, QoS handling, service data flow measurement, and online/offline charging interactions. The HSS/SPR stores subscriber data and subscription related information for end users, such as in subscriber profiles.

SUMMARY

One embodiment described herein directs and/or redirects service data flows among PDNs with the assistance of a subscriber database, such as an HSS or SPR. As today's 4G/LTE network becomes more mature, it will become desirable to direct and redirect service data flows as needed among Packet Data Networks (PDNs) in an effective manner. In one embodiment, the subscriber database stores subscriber profiles for end users which indicate, among other things, the services available to the end users. Additionally, the subscriber database may store direction criteria defining conditions for directing service data flows to a PDN, redirection criteria defining conditions for redirecting service data flows from one PDN to another PDN, and mapping data which indicates how the service data flows are directed to a PDN or how the service data flows are redirected among the PDNs. The subscriber database can then distribute the direction/redirection criteria and mapping data to elements of a packet core network so that service data flows are handled effectively.

One embodiment comprises a subscriber database operable to store subscriber profiles for end users of a communication network. The subscriber database is further operable to store direction criteria defining conditions for directing service data flows to Packet Data Networks (PDN), and to store mapping data associated with the direction criteria that includes information for directing the service data flows to the PDNs. The subscriber database is further operable to receive a query from a network element of the communication network involving a data service requested by an end user, to identify the direction criteria and mapping data for the data service, and to transmit the direction criteria and mapping data to the network element in response to the query to allow the network element to direct a service data flow to a PDN for the data service.

In another embodiment, the subscriber database is further operable to store redirection criteria defining conditions for redirecting service data flows among PDNs, and to store mapping data associated with the redirection criteria that includes information for redirecting service data flows from one PDN to another PDN. The subscriber database is further operable to receive another query from the network element involving a service data flow for the end user over a first PDN, to identify the redirection criteria and mapping data for the service data flow, and to transmit the redirection criteria and mapping data to the network element in response to the other query to allow the network element to redirect the service data flow from the first PDN to a second PDN.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 2 illustrates a subscriber database storing direction criteria and associated mapping data, and storing redirection criteria and associated mapping data in an exemplary embodiment.

FIG. 7 is a message diagram illustrating an example of redirecting a service data flow in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
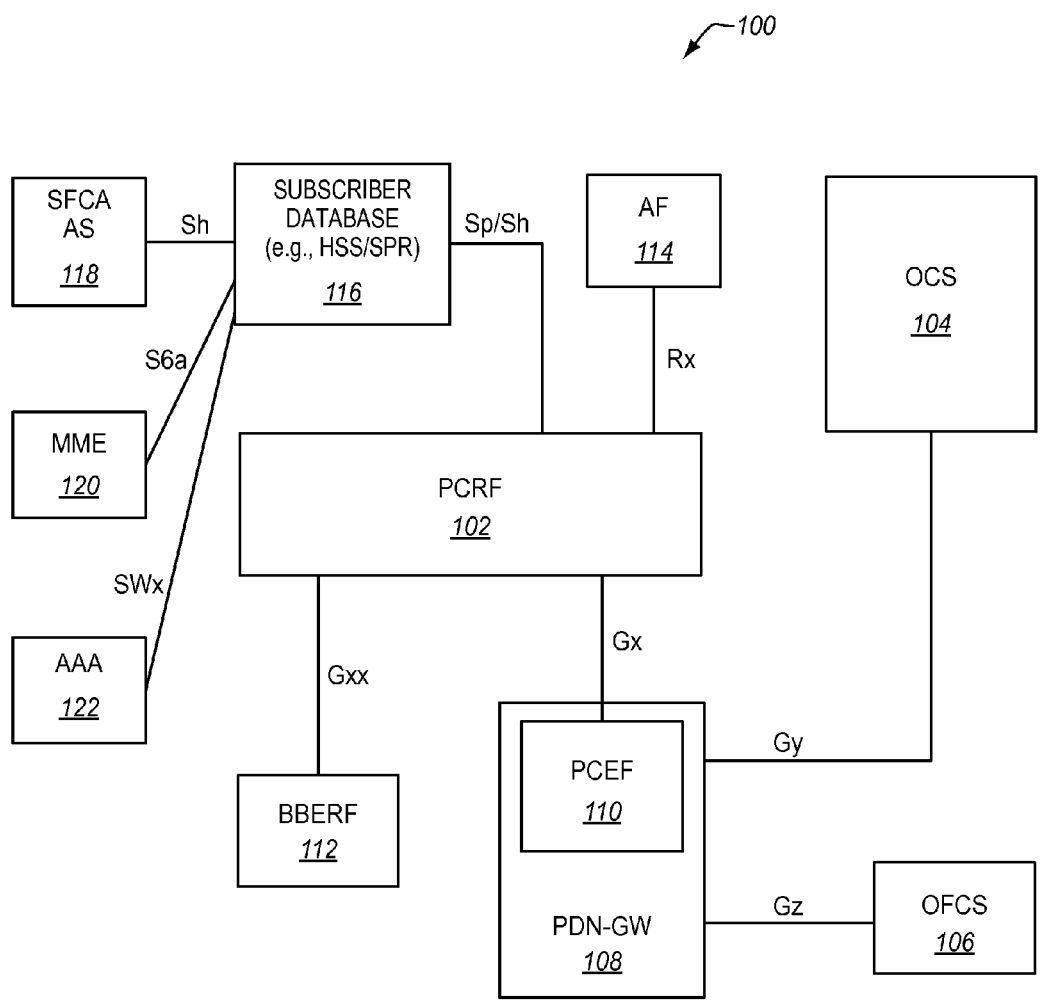
FIG. 1 illustrates an architecture for a communication network in an exemplary embodiment.

FIG. 1 illustrates an architecture 100 for a communication network in an exemplary embodiment. Architecture 100 may be for an LTE network or another type of 4G network. Architecture 100 includes a Policy and Charging Rules Function (PCRF) 102, an Online Charging System (OCS) 104, an Offline Charging System (OFCS) 106, a PDN-Gateway (GW) 108 that includes a Policy and Charging Enforcement Function (PCEF) 110, a Bearer Binding and Event Reporting Function (BBERF) 112, and an application function (AF) 114. These elements of architecture 100 are described in 3GPP 23.203.

Architecture 100 further includes a subscriber database 116. Subscriber database 116 comprises any system, server, or element that is configured to store subscriber profiles for end users. In this embodiment, subscriber database 116 is enhanced to also store additional data that is used to direct and/or redirect service data flows to PDNs, which is described in more detail below. Examples of PDNs include a 3GPP PDN (EPC/LTE), non-3GPP PDNs (eHRPD), IP Multimedia Subsystem (IMS), standalone application entities (such as app stores), etc. Subscriber database 116 is coupled to PCRF 102 over an Sp interface, which is based on 3GPP Diameter Sh protocol. Also connected to subscriber database 116 are Service Flow Condition Analysis (SFCA) Application Server (AS) 118, Mobility Management Entity (MME) 120, and Authentication, Authorization, and Accounting (AAA) server 122. The interface between SFCA AS 118 and subscriber database 116 is based on 3GPP Diameter Sh protocol. The interface between MME 120 and subscriber database 116 is the S6a interface. The interface between AAA server 122 and subscriber database 116 is the SWx interface.

Subscriber database 116 is configured to store direction criteria (also referred to as service flow direction criteria (SFDC)) and associated mapping data. The direction criteria define one or more conditions for directing a service data flow to a Packet Data Network (PDN). The associated mapping data includes information or instructions for directing a service data flow to a PDN when a condition from the direction criteria is satisfied. For example, the direction criteria may define a condition such as "normal". When this condition occurs, the mapping data associated with the condition "normal" may indicate "Direct to PDN1". Thus, the mapping data includes information for directing a service data flow to PDN1 when conditions are "normal". If conditions are other than "normal" (e.g., jam, congestion, loss of connection, etc), then there may be other mapping data associated with those conditions, such as "Direct to PDN2", "Direct to PDN3", etc.

The direction criteria and mapping data stored at subscriber database 116 complies with the 3GPP Sh standard as Sh repository/transparent data. Sh repository/transparent data includes fields holding service indication data and corresponding service data. This means that the repository data for direction criteria and mapping data that is stored has service indication data and corresponding service data. The service indication indicates a status condition under which a service flow is to be directed. The associated service data indicates mapping for the service flow when the corresponding status condition is experienced. An example of direction criteria and mapping data is:

Service indication data: Service-flow-jam
Service data: Direct to PDN2

Subscriber database 116 is further configured to store redirection criteria (also referred to as service flow redirection criteria (SFRC)) and associated mapping data. Redirection criteria define one or more conditions for redirecting a service data flow from one PDN to another PDN. The associated mapping data includes information for redirecting a service data flow from one PDN to another PDN when a condition from the redirection criteria is satisfied. For example, the redirection criteria may define a condition such as "jam". When this condition occurs, the mapping data associated with the condition "jam" may include information such as: "If PDN1, then redirect to PDN2; if PDN3, then redirect to PDN5". Thus, the mapping data includes information for redirecting a service data flow from PDN1 to PDN2 when there is a jam on PDN1, and includes information for redirecting a service data flow from PDN3 to PDN5 when there is a jam on PDN3. If conditions are other than "jam", then there may be other mapping data associated with those conditions.

The redirection criteria and mapping data stored at subscriber database 116 complies with the 3GPP Sh standard as Sh repository/transparent data. This means that the repository data has service indication data and corresponding service data. An example of redirection criteria and mapping data is:

Service indication data: Service-flow-jam
Service data: If PDN1, then redirect to PDN2; if PDN3, then redirect to PDN5, etc. Thus, under the service-flow-jam status condition, the redirection criteria and mapping data stored at subscriber database indicates that the service flow is to be redirected to PDN2 if on PDN1, is to be redirected to PDN2 if on PDN1, etc.

The direction/redirection criteria and mapping data may be further associated with a Public Service ID (PSI). In this case, the PSI may represent PCRF 102. For example, the PSI may be: "sip:perf@abc.net". A PSI is globally applicable to multiple end users. Thus the direction/redirection criteria and mapping data which is associated with a PSI is applicable to multiple end users.

The direction/redirection criteria and mapping data may also be associated with a Public User ID (PUID) for an end user. For example, the PUID may be: "user@abc.com". A PUID is specific to an end user. Thus the direction/redirection criteria and mapping data which is associated with a PUID is applicable to a single end user. Because the direction/redirection criteria and mapping data may be associated with both a PSI and a PUID, the direction/redirection criteria and mapping data may be applicable to multiple end users and/or a single end user. FIG. 2 illustrates subscriber database 116 storing direction criteria and associated mapping data, and storing redirection criteria and associated mapping data in an exemplary embodiment.

Subscriber database 116 may make the direction/redirection criteria and mapping data available to other elements of architecture 100. One typical element that may access the subscriber database 116 is a Policy and Charging Rules Function (PCRF) 102. If an end user (not shown) requests a data service, then PCRF 102 will receive a request for Policy Charging and Control (PCC) rules from PCEF 110. PCRF 102 is charged with making a PCC decision for the requested data service, which includes selection of a Packet Data Network (PDN) to be used for a bearer connection. This means that a service data flow established for the data service will be over the selected PDN. The request for PCC rules may include a variety of data or parameters that may be used to make a PCC decision. For example, the request may include a subscriber ID, the type of the radio access technology used for a 3GPP access network, etc. However, PCRF 102 may desire additional information when making the PCC decision. In the embodiments described herein, subscriber database 116 stores direction criteria and mapping data which allows PCRF 102 to select a PDN in the PCC decision. Thus, PCRF 102 sends a query (e.g., Diameter Sh User Data Request (UDR)) to subscriber database 116 to retrieve this information.

Figure 3:
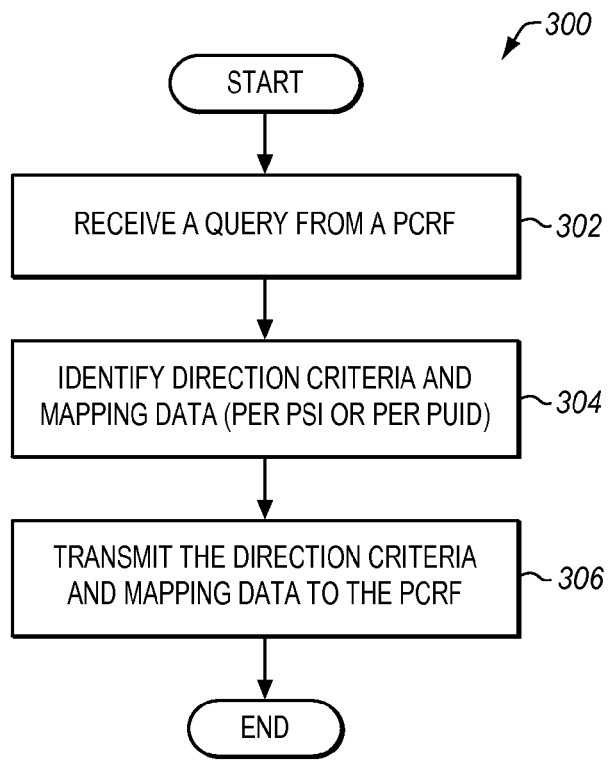
FIG. 3 is a flow chart illustrating a method of providing direction criteria and mapping data in an exemplary embodiment.

FIG. 3 is a flow chart illustrating a method 300 of providing direction criteria and mapping data in an exemplary embodiment. The steps of method 300 are described with reference to architecture 100 in FIG. 1, although method 300 may be performed in other networks or systems. The steps of the flow charts described herein are not all inclusive and may include other steps not shown. The steps may also be performed in an alternative order.

In step 302, subscriber database 116 receives the query from PCRF 102 involving a data service requested by the end user. In step 304, subscriber database 116 identifies the direction criteria and mapping data for the requested data service. For example, if the direction criteria and mapping data is associated with a PSI, then subscriber database 116 may identify the direction criteria and mapping data for the data service based on the PSI provided by PCRF 102 in the query. If the direction criteria and mapping data is associated with a PUID, then subscriber database 116 may identify the direction criteria and mapping data for the data service based on the PUID for the end user (provided by PCRF 102 in the query). In step 306, subscriber database 116 transmits the direction criteria and mapping data to PCRF 102 in response to the query. For example, the response may be a Diameter Sh User Data Answer (UDA). The direction criteria and mapping data allows PCRF 102 to direct a service data flow for the data service to a PDN. Subscriber database 116 may operate in a similar manner in response to a query from another type of network element.

PCRF 102 may process the direction criteria and mapping data, along with other information, to make a PCC decision for the requested data service. The PCC decision includes an indication of the PDN selected for the data service. For example, the PCC decision may indicate that "PDN1" is to be used for the data service. PCRF 102 then transmits a response or acknowledgement to PCEF 110 that includes the PCC rules resulting from the PCC decision (see FIG. 1). The data service may then be established for the end user over the selected PDN.

After the data service has been established, PCRF 102 may receive a request for new PCC rules from PCEF 110. For example, assume that the end user changes the media type for the data service (e.g., from audio to audio/video). When this occurs, PCEF 110 may request new PCC rules for the data service. The PCC rules may result in service data flows for the data service being redirected to another PDN. Thus, PCRF 102 may again query subscriber database 116 for additional information when making the new PCC decision. In the embodiments described herein, subscriber database 116 stores redirection criteria and mapping data which allows PCRF 102 to select a new PDN in the PCC decision. Thus, PCRF 102 sends a query to subscriber database 116 to retrieve this information.

Figure 4:
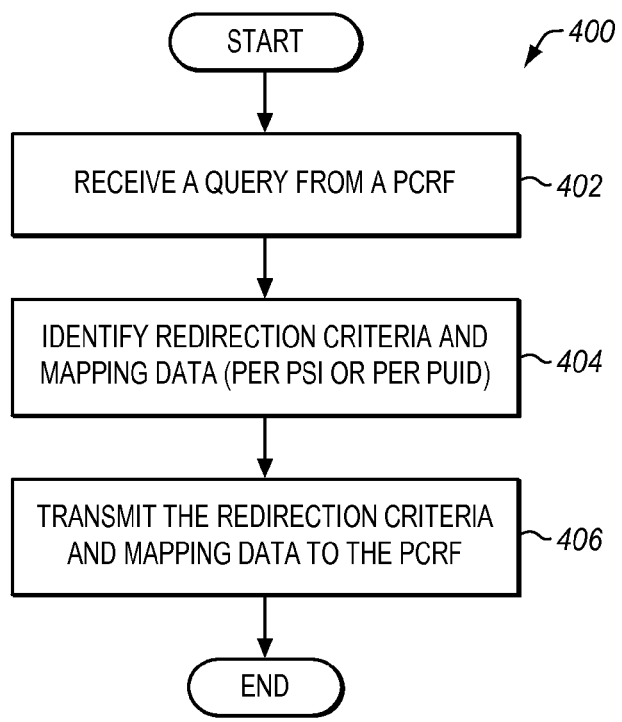
FIG. 4 is a flow chart illustrating a method of providing redirection criteria and mapping data in an exemplary embodiment.

FIG. 4 is a flow chart illustrating a method 400 of providing redirection criteria and mapping data in an exemplary embodiment. The steps of method 400 are described with reference to architecture 100 in FIG. 1, although method 400 may be performed in other networks or systems.

In step 402, subscriber database 116 receives the query from PCRF 102 involving a service data flow for the end user. In step 404, subscriber database 116 identifies the redirection criteria and mapping data for the service data flow. For example, if the redirection criteria and mapping data is associated with a PSI, then subscriber database 116 may identify the redirection criteria and mapping data based on the PSI provided by PCRF 102 in the query. If the redirection criteria and mapping data is associated with a PUID, then subscriber database 116 may identify the redirection criteria and mapping data based on the PUID for the end user (provided by PCRF 102 in the query). In step 406, subscriber database 116 transmits the redirection criteria and mapping data to PCRF 102 in response to the query. The redirection criteria and mapping data allows PCRF 102 to redirect the service data flow established for the data service from one PDN to another PDN. Subscriber database 116 may operate in a similar manner in response to a query from another type of network element.

PCRF 102 may process the redirection criteria and mapping data, along with other information, to make a new PCC decision for the requested data service. The new PCC decision includes an indication of the new PDN where the service data flow is being redirected. For example, the PCC decision may indicate that the service data flow is being redirected from "PDN1" to "PDN2". PCRF 102 then transmits a response or acknowledgement to PCEF 110 that includes the PCC rules resulting from the PCC decision. The service data flow may then be redirected from one PDN to another PDN.

In addition to storing direction/redirection criteria and mapping data, subscriber database 116 may be further configured to store flow condition data (also referred to as current service flow condition (CSFC) data). Flow condition data indicates the status of a PDN connecting one or more service data flows, or the status of one or more service data flows over a PDN. The flow condition data may be stored per PSI, which is globally applicable to multiple end users. When stored per PSI, a PSI may represent a Service Flow Condition Analysis Application Server (SFCA AS) 118 (see FIG. 1). For example, the PSI may be: "sip:sfca-as@abc.net".

The flow condition data complies with the 3GPP Sh standard as Sh repository/transparent data. This means the repository data has parameters for storing service indication data and corresponding service data. The repository data for flow condition data will store an indicator that stored information is service flow condition information in the service indication field and a status in the corresponding service data field. Examples of flow condition data include:

Example 1

Service indication: Current-Service-Flow-Condition
Service data: Normal

Example 2

Service indication: Current-Service-Flow-Condition
Service data: Service flow jam at PDN1

The service indication for the flow condition data will default to "normal".

As stated above, the flow condition data may be provided to subscriber database 116 by SFCA AS 118. When SFCA AS 118 detects certain service flow conditions occurring in a PDN, SFCA AS 118 sends an update to subscriber database 116 with the flow condition data. For example, SFCA AS 118 may transmit a Diameter Sh Profile Update Request (PUR) to subscriber database 116 that includes the updated flow condition data. Subscriber database 116 then stores the flow condition data along with a PSI for SFCA AS 118.

Subscriber database 116 may thus store direction/redirection criteria, mapping data, and flow condition data. When PCRF 102 or another network element sends a query, subscriber database 116 is able to identify the proper mapping data for direction/redirection, and provide the mapping data to the requesting element. Also, before sending subscriber data to a network element (e.g., MME 120 or AAA server 122), subscriber database 116 may check the flow condition data that it stores. This is further illustrated in FIG. 5.

Figure 5:
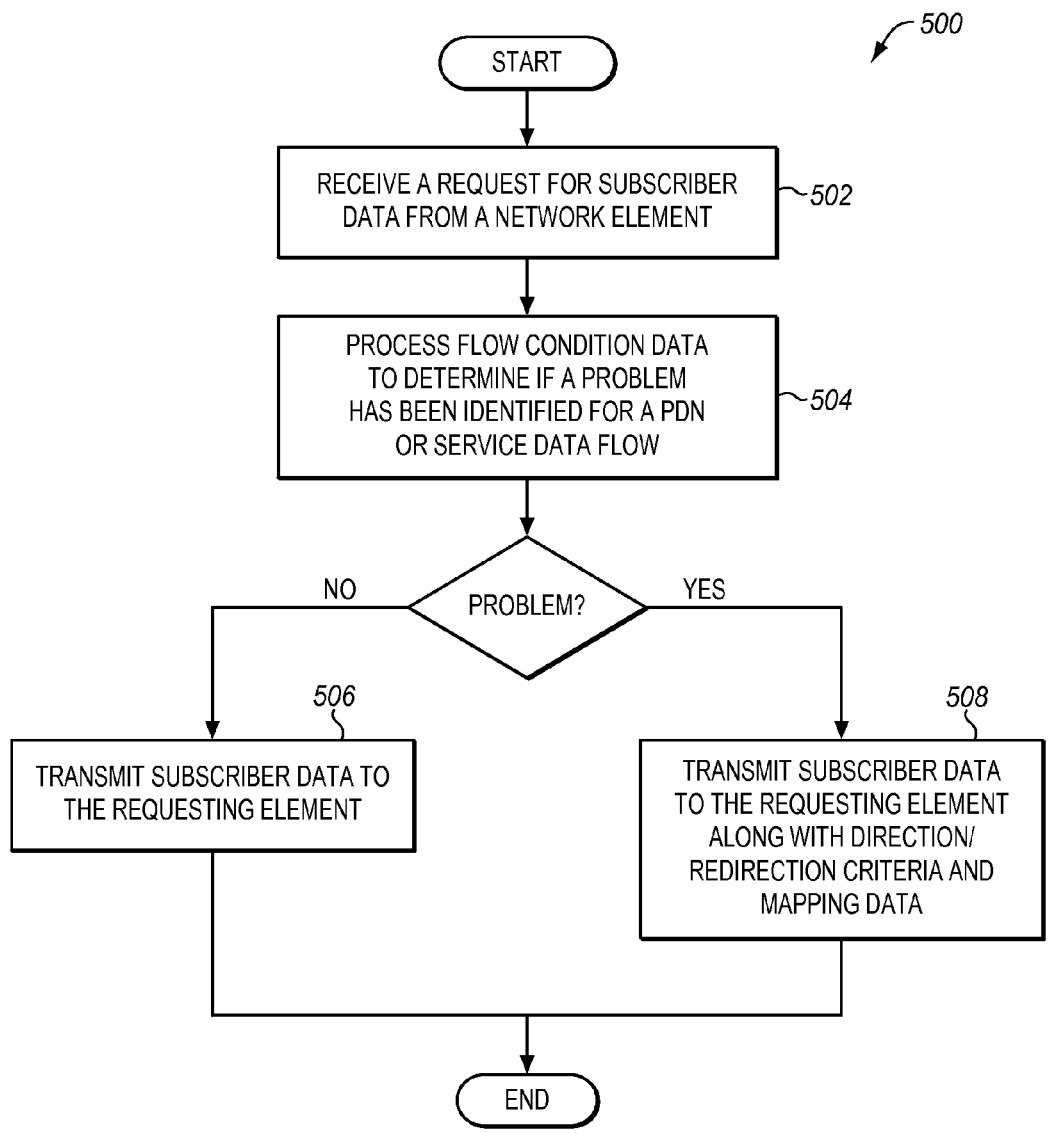
FIG. 5 is a flow chart illustrating a method of providing subscriber data to a requesting element in an exemplary embodiment.

FIG. 5 is a flow chart illustrating a method 500 of providing subscriber data to a requesting element in an exemplary embodiment. The steps of method 500 are described with reference to architecture 100 in FIG. 1, although method 500 may be performed in other networks or systems.

In step 502, subscriber database 116 receives a request for subscriber data from a network element (e.g., MME 120 or AAA server 122 in FIG. 1). The request may result from an end user registering or re-registering with the network. Thus, the end user is either presently utilizing a data service, or is initiating a data service. Either way, a service data flow is presently established or will be established for the end user. Thus, the network element requests the subscriber data from subscriber database 116 to initiate or maintain a session for the data service that includes one or more service data flows.

In response to the request, subscriber database 116 processes the flow condition data that is stored to determine if a problem has been identified for a PDN in step 504. For example, the flow condition data may default to "normal". If the service data indicates something other than "normal", such as "service flow jam", then subscriber database 116 determines that a problem has been identified.

If no problem is identified, then subscriber database 116 transmits the subscriber data to the requesting element in step 506. If a problem is identified, then subscriber database 116 transmits the subscriber data to the requesting element along with the direction/redirection criteria and mapping data in step 508. The direction/redirection criteria and mapping data may be per PSI and/or per PUID.

As an example, assume that subscriber database 116 receives a request for subscriber data from MME 120 in FIG. 1. Subscriber database 116 processes the flow condition data that is stored to determine if a problem has been identified. If the flow condition data stored for the PSI of SFCA AS 118 indicates "Service flow jam at PDN 1", then subscriber database 116 determines that a problem has been identified. Subscriber database 116 then includes the mapping data of "If PDN1, then redirect to PDN2" in addition to the normal subscriber data.

The above embodiments describe a way of effectively using a subscriber database 116 (e.g., HSS) to direct or redirect service data flows in a 4G network. Through the assistance of subscriber database 116, service data flows may be allocated or redirected in an efficient manner between PDNs to balance network traffic, satisfy bilateral agreements between service providers, satisfy specific needs for different applications, etc.

EXAMPLE

Figure 6:
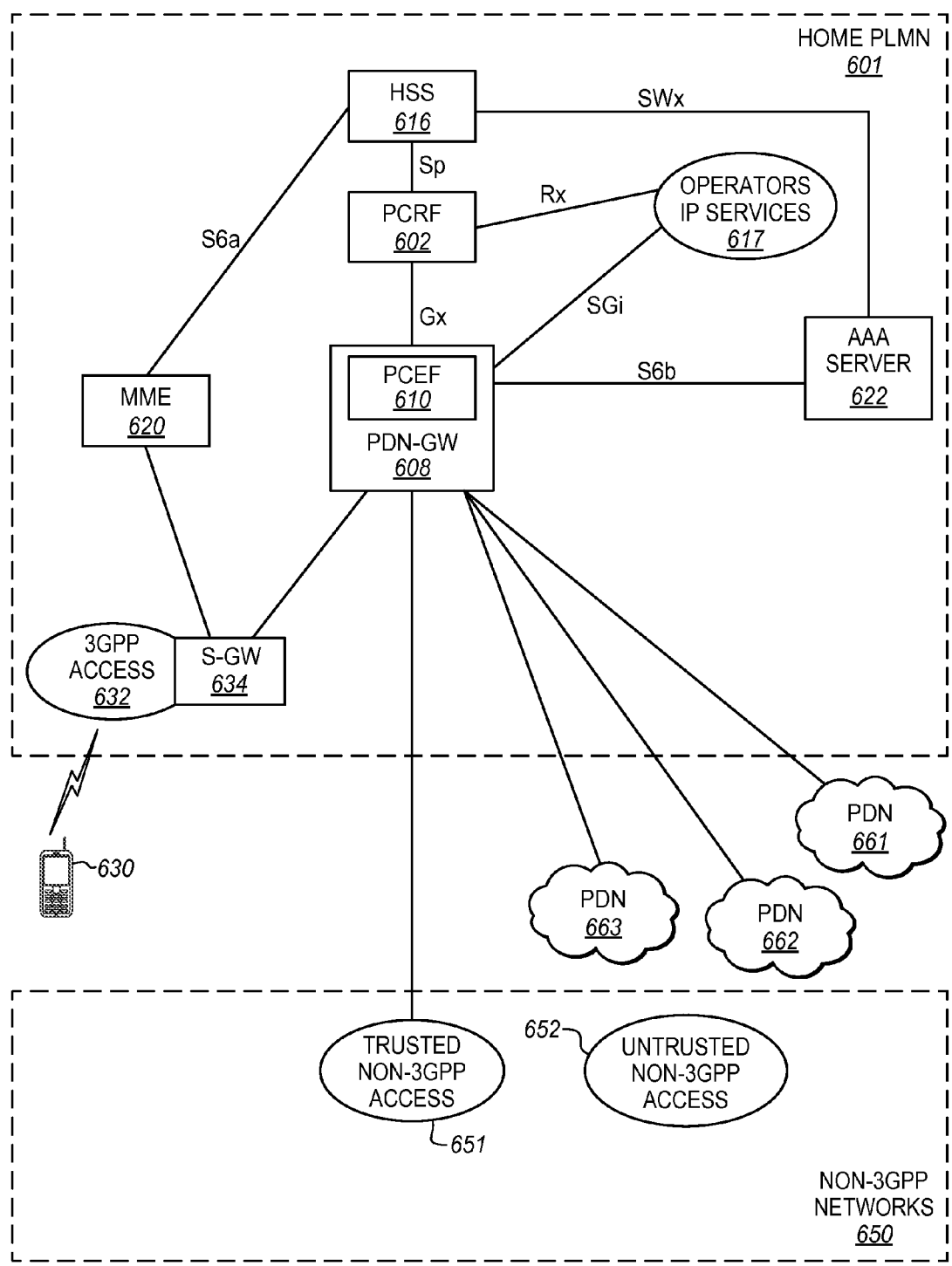
FIG. 6 illustrates a Long Term Evolution/Evolved Packet Core (LTE/EPC) network in an exemplary embodiment.

FIGS. 6-7 illustrate an example of a Long Term Evolution/Evolved Packet Core (LTE/EPC) network redirecting a service data flow using an HSS. FIG. 6 illustrates an LTE/EPC network 600 in an exemplary embodiment. LTE/EPC network 600 includes a home Public Land Mobile Network (PLMN) 601 and one or more non-3GPP networks 650. Home PLMN 601 represents a packet core network where an end user of a mobile device (or UE) 630 has subscribed to a service plan. Home PLMN 601 includes a 3GPP access network 632 and the following network nodes: a serving gateway (S-GW) 634, a packet data network gateway (PDN-GW) 608, a Policy and Charging Rules Function (PCRF) 602, a Home Subscriber Server (HSS) 616, operator's IP services 617 (e.g., IMS), a AAA server 622, and an MME 620. PDN-GW 608 includes a Policy and Charging Enforcement Function (PCEF) 610. Network 600 may further include a Bearer Binding and Event Reporting Function (BBERF), a subscription Profile Repository (SPR), and an application function (AF) (not shown) as is known for PCC architectures. Non-3GPP network 650 includes a trusted non-3GPP access network 651 and an un-trusted non-3GPP access network 652.

PDN-GW 608 is connected to a plurality of Packet Data Networks (PDN) 661-663. When a service data flow is established for a data service, the service data flows are established over these PDNs 661-663. According to this example, HSS 616 stores direction criteria and associated mapping data for directing service data flows to a particular PDN 661-663. HSS 616 also stores redirection criteria and associated mapping data for redirecting service data flows between PDNs 661-663.

Assume for this embodiment that mobile device 630 wants to access a data service provided by LTE network 600, such as a video session, online gaming, etc. To do so, mobile device 630 exchanges messages with PDN-GW 608 to request an IP-CAN session. For example, mobile device 630 may send a SIP message, such as a SIP INVITE, to request the IP-CAN session. The request from mobile device 630 includes a session description of a desired data service. PCEF 610 in PDN-GW 608 receives the request to establish the IP-CAN session, and transmits a request for PCC rules (indication of IP-CAN session establishment) to PCRF 602 over the Gx interface. The request for PCC rules may include a variety of data or parameters used to make a PCC decision. For example, the request may include a subscriber ID (e.g., in a Subscription-ID Attribute Value Pair (AVP)), the type of RAN connected to mobile device 630, the type of the radio access technology used for 3GPP access network 632, information on an external packet data network (if available), the IP address of mobile device 630, etc.

PCRF 602 is charged with making a PCC decision for the data service. Before making the PCC decision, PCRF 602 may retrieve subscriber data, such as a subscriber profile, for mobile device 630 from HSS 616. PCRF 602 may also retrieve direction criteria and mapping data for selecting the initial PDN for the data service from HSS 616. PCRF 602 then processes the subscriber data and charging rules to make a PCC decision for the data service. The PCC decision includes the selection of the initial PDN for the data service. PCRF 602 then transmits a response or acknowledgement to PCEF 610 that includes the PCC rules resulting from the PCC decision. PCEF 610 then establishes a service data flow over the selected PDN (assume PDN 661) for the data service.

After the service data flow is established, there may be reasons to redirect the service data flow from PDN 661 to another PDN. FIG. 7 is a message diagram illustrating an example of redirecting a service data flow in an exemplary embodiment. In FIG. 7, a service data flow is established over PDN 661 for the requested data service. At some point, mobile device 630 transmits a Session Initiation Protocol (SIP) request for a new media type description that is received by PCEF 610. For example, if the original media type is audio, then the new media type may be for audio and video. In response to the SIP request, PCEF 610 sends a request to PCRF 602 for a new PCC decision.

Before making the PCC decision, PCRF 602 queries HSS 616 for information. Thus, PCRF 602 transmits a Diameter Sh User Data Request (UDR) to HSS 616. In response to the UDR, HSS 616 may identify subscriber data for mobile device 630. Additionally, HSS 616 identifies redirection criteria and mapping data for the service data flow established for mobile device 630. HSS 616 may identify the redirection criteria and mapping data based on a PSI for PCRF 602, or based on a PUID for mobile device 630. In either case, HSS 616 transmits a Diameter Sh User Data Answer (UDA) to PCRF 602 that includes the redirection criteria, mapping data, and other subscriber data.

PCRF 602 then makes a new PCC decision based on the redirection criteria and mapping data. Assume for this example that the redirection criteria reads "Service-flow-jam" and the mapping data reads "If PDN 661, then redirect to PDN 662". Further assume that PCRF 602 determines that a service flow jam has occurred on PDN 661. Thus, PCRF 602 will redirect the service data flow for the data service from PDN 661 to PDN 662 in the new PCC decision. PCRF 602 then transmits a response or acknowledgement to PCEF 610 that includes the PCC rules resulting from the new PCC decision. PCEF 610 then redirects the service data flow from PDN 661 to PDN 662 for the data service.

If PCRF 602 is requested to perform a PCC decision yet again, then PCRF 602 may query HSS 616 for redirection criteria and mapping data. Thus, the service data flow may be redirected any number of times as defined by redirection criteria and mapping data.

Any of the various elements shown in the figures or described herein may be implemented as hardware, software in conjunction with hardware, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The executable instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
a subscriber database comprising a processor operable to store subscriber profiles for end users of a communication network;
the subscriber database further operable to store direction criteria defining conditions for directing service data flows to Packet Data Networks (PDN), to store mapping data associated with the direction criteria that includes information for directing the service data flows to the PDNs when a condition from the direction criteria is satisfied, and to store flow condition data indicating a status of the service data flows over the PDNs;
the subscriber database further operable to transmit the direction criteria and mapping data to a network element in response to a query to allow the network element to direct a service data flow to a first PDN for a data service;
the subscriber database is further operable to store redirection criteria defining conditions for redirecting service data flows among PDNs, and to store mapping data associated with the redirection criteria that includes information for redirecting service data flows from one PDN to another PDN;
the subscriber database is further operable to transmit the redirection criteria and mapping data to the network element in response to another query to allow the network element to redirect the service data flow from the first PDN to a second PDN.

2. The system of claim 1 wherein:
the subscriber database is further operable to process the flow condition data to identify a problem in the first PDN, and to transmit the redirection criteria and mapping data to the network element when the problem is identified in the first PDN.

3. The system of claim 1 wherein:
the network element comprises a Policy and Charging Rules Function (PCRF); and
the subscriber database connects to the PCRF over an Sp interface.

4. The system of claim 1 wherein:
the subscriber database is further operable to store the direction criteria and mapping data with a Public Service Identifier (PSI); and
the subscriber database is further operable to store the redirection criteria and mapping data with the PSI.

5. The system of claim 1 wherein:
the subscriber database is further operable to store the direction criteria and mapping data with a Public User Identifier (PUID) for an end user; and the subscriber database is further operable to store the redirection criteria and mapping data with the PUID for the end user.

6. The system of claim 1 wherein:
the subscriber database is further operable to store the flow condition data with a Public Service Identifier (PSI).

7. A method comprising:
storing subscriber profiles for end users of a communication network in a subscriber database;
storing, in the subscriber database, direction criteria defining conditions for directing service data flows to Packet Data Networks (PDN), mapping data associated with the direction criteria that includes information for directing the service data flows to the PDNs when a condition from the direction criteria is satisfied, and flow condition data indicating a status of the service data flows over the PDNs;
transmitting the direction criteria and mapping data from the subscriber database to a network element in response to a query to allow the network element to direct a service data flow to a first PDN for a data service;
storing, in the subscriber database, redirection criteria defining conditions for redirecting service data flows among PDNs, and mapping data associated with the redirection criteria that includes information for redirecting service data flows from one PDN to another PDN; and
transmitting the redirection criteria and mapping data from the subscriber database to the network element in response to another query to allow the network element to redirect the service data flow from the first PDN to a second PDN.

8. The method of claim 7 further comprising:
processing the flow condition data to identify a problem in the first PDN; and
transmitting the redirection criteria and mapping data to the network element when the problem is identified in the first PDN.

9. The method of claim 7 wherein:
the network element comprises a Policy and Charging Rules Function (PCRF); and
the subscriber database connects to the PCRF over an Sp interface.

10. The method of claim 7 wherein:
storing the direction criteria and mapping data comprises storing the direction criteria and mapping data with a Public Service Identifier (PSI); and
storing the redirection criteria and mapping data comprises storing the redirection criteria and mapping data with the PSI.

11. The method of claim 7 wherein:
storing the direction criteria and mapping data comprises storing the direction criteria and mapping data with a Public User Identifier (PUID) for an end user; and
storing the redirection criteria and mapping data comprises storing the redirection criteria and mapping data with the PUID for the end user.

12. The method of claim 7 wherein:
storing the flow condition data comprises storing the flow condition data with a Public Service Identifier (PSI).

13. A system comprising:
a Home Subscriber Server (HSS) coupled to a Policy and Charging Rules Function (PCRF) over an Sp interface;
the HSS comprising a processor operable to store subscriber profiles for end users of a communication network;
the HSS further operable to store redirection criteria defining conditions for redirecting service data flows among Packet Data Networks (PDNs), to store mapping data associated with the redirection criteria that includes information for redirecting service data flows from one PDN to another PDN, and to store flow condition data indicating a status of service data flows over the PDNs;
the HSS further operable to receive a query from the PCRF over an Sp interface involving a service data flow for an end user over a first PDN, to process the flow condition data to identify a problem with the first PDN, to identify the redirection criteria and mapping data for the service data flow, and to transmit the redirection criteria and mapping data to the PCRF over the Sp interface to allow the PCRF to redirect the service data flow from the first PDN to a second PDN.

14. The system of claim 13 wherein:
the flow condition data is stored with a Public Service Identifier (PSI).

* * * * *